(12) United States Patent
Dickinson et al.

(10) Patent No.: US 11,379,276 B2
(45) Date of Patent: Jul. 5, 2022

(54) EVENT TRANSLATION FOR BUSINESS OBJECTS

(71) Applicant: SourceCode Technology Holdings, Inc., Bellevue, WA (US)

(72) Inventors: Jonathan Dickinson, Seattle, WA (US); Mike Talley, Centennial, CO (US)

(73) Assignee: SOURCECODE TECHNOLOGY HOLDINGS, INC., Bellevue, WA (US)

( * ) Notice: Subject to any disclaimer, the term of this patent is extended or adjusted under 35 U.S.C. 154(b) by 0 days.

(21) Appl. No.: 17/086,659

(22) Filed: Nov. 2, 2020

(65) Prior Publication Data

US 2022/0138024 A1    May 5, 2022

(51) Int. Cl.
*G06F 9/54* (2006.01)
*G06F 16/21* (2019.01)
*G06Q 10/06* (2012.01)
*G06F 9/38* (2018.01)

(52) U.S. Cl.
CPC ............ *G06F 9/542* (2013.01); *G06F 9/3836* (2013.01); *G06F 9/546* (2013.01); *G06F 16/211* (2019.01); *G06Q 10/067* (2013.01)

(58) Field of Classification Search
None
See application file for complete search history.

(56) References Cited

U.S. PATENT DOCUMENTS

| | | | |
|---|---|---|---|
| 2007/0136675 A1* | 6/2007 | van Wyk | G06Q 10/06 715/764 |
| 2009/0249360 A1* | 10/2009 | Wiseman | G06F 16/258 719/315 |
| 2016/0321307 A1* | 11/2016 | Dingman | G06F 16/25 |
| 2019/0102436 A1* | 4/2019 | Bishnoi | G06F 16/244 |

\* cited by examiner

*Primary Examiner* — Charles E Anya
(74) *Attorney, Agent, or Firm* — K&L Gates LLP

(57) ABSTRACT

Methods and systems for translating events for use by business objects. In one embodiment, a method is provided that includes receiving a scheming via a discovery function. The schema may correspond to a data source with a business object environment and may describe properties of the data source. A business object may be created within the business object environment and may include an inbox to receive events and a translation function. An event may be received from the event source at the inbox. The event may be translated according to the translation function into a business object event that corresponds to a property of the data source. The business object event may be provided to at least one business object within the business object environment.

18 Claims, 7 Drawing Sheets

EVENT TRANSLATION FOR BUSINESS OBJECTS

BACKGROUND

Computing systems may exchange information using one or more event systems. For example, upon the occurrence of a particular, specified event, the event systems may transmit a corresponding event to other computing systems. In particular, certain computing systems may subscribe to events published by other computing systems.

SUMMARY

The present disclosure presents new and innovative systems and methods for translating events for use by business objects. In a first aspect, a method is provided that includes receiving, via a discovery function, a schema corresponding to a data source within a business object environment. The schema may describe properties of the data source within the business object. A business object event source may be created within the business object environment. The business object event source may include an inbox that receives events from an event source and a translation function that translates events from the event source. An event from the event source may be received at the inbox. The event from the event source may be translated, according to the translation function, into a business object event that corresponds to at least one of the properties of the data source. The business object event may be provided to at least one business object within the business object environment.

In a second aspect according to the first aspect, the translation function includes a mapping from contents of events to corresponding properties of the data source.

In a third aspect according to any of the first and second aspects, the translation function is determined based on at least one of (i) indications of corresponding properties included within events received from the event source and (ii) names of data fields included within events received from the event source.

In a fourth aspect according to any of the first through third aspects, the method further includes translating the event from the event source into two or more business object events.

In a fifth aspect according to any of the first through fourth aspects, the method further includes executing, by the at least one business object, an action in response to receiving the business object event.

In a sixth aspect according to the fifth aspect, the action includes one or more of performing a method of the at least one business object, executing a workflow within based on the at least one business object, and updating a property of the at least one business object.

In a seventh aspect according to any of the fifth and sixth aspects, the method further includes receiving a request to link the business object event to an action performed by the at least one business object. The method may also include linking, within the at least one business object, the business object event to the action such that the action is performed whenever the business object event is received from the business object event source.

In an eighth aspect according to any of the first through seventh aspects, the business object event source contains a plurality of inboxes.

In a ninth aspect according to the eighth aspect, the method further includes translating at least two events from at least two of the plurality of inboxes into a business object event.

In a tenth aspect according to any of the eighth and ninth aspects, at least two of the plurality of inboxes correspond to the event source.

In an eleventh aspect according to any of the eighth through tenth aspect, the plurality of inboxes correspond to a plurality of event sources.

In a twelfth aspect, a system is provided that includes a processor and a memory storing instructions. When executed by the processor, the instructions may cause the processor to receive, via a discovery function, a schema corresponding to a data source within a business object environment. The schema may describe properties of the data source within the business object. A business object event source may be created within the business object environment. The business object event source may include an inbox that receives events from an event source and a translation function that translates events from the event source. An event from the event source may be received at the inbox. The event from the event source may be translated, according to the translation function, into a business object event that corresponds to at least one of the properties of the data source. The business object event may be provided to at least one business object within the business object environment.

In a thirteenth aspect according through the twelfth aspect, the translation function includes a mapping from contents of events to corresponding properties of the data source.

In a fourteenth aspect according to any of the twelfth through thirteenth aspects, the translation function is determined based on at least one of (i) indications of corresponding properties included within events received from the event source and (ii) names of data fields included within events received from the event source.

In a fifteenth aspect according to any of the twelfth through fourteenth aspects, the instructions further cause the processor to translate the event from the event source into two or more business object events.

In a sixteenth aspect according to any of the twelfth through fifteenth aspects, the instructions further cause the processor to execute, by the at least one business object, an action in response to receiving the business object event.

In a seventeenth aspect according to any of the twelfth through sixteenth aspects, the business object event source contains a plurality of inboxes.

In an eighteenth aspect according to the seventeenth aspect, the instructions further cause the processor to translate at least two events from at least two of the plurality of inboxes into a business object event.

In a nineteenth aspect according to any of the seventeenth and eighteenth aspects, at least two of the plurality of inboxes correspond to the event source.

In a twentieth aspect, a non-transitory, computer-readable medium is provided storing instructions. When executed by the processor, the instructions may cause the processor to receive, via a discovery function, a schema corresponding to a data source within a business object environment. The schema may describe properties of the data source within the business object. A business object event source may be created within the business object environment. The business object event source may include an inbox that receives events from an event source and a translation function that translates events from the event source. An event from the event source may be received at the inbox. The event from the event source may be translated, according to the translation function, into a business object event that corresponds to at least one of the properties of the data source. The business object event may be provided to at least one business object within the business object environment.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Business objects may be used by computing devices to simplify the techniques required to access and manipulate data stored in various data sources. For example, business objects such as SmartObjects by K2® may be used to interact with methods or properties of data and data sources. For example, business objects may be used to create user interfaces that non-technical users may utilize to view and manipulate data stored within the data sources.

Figure 1:
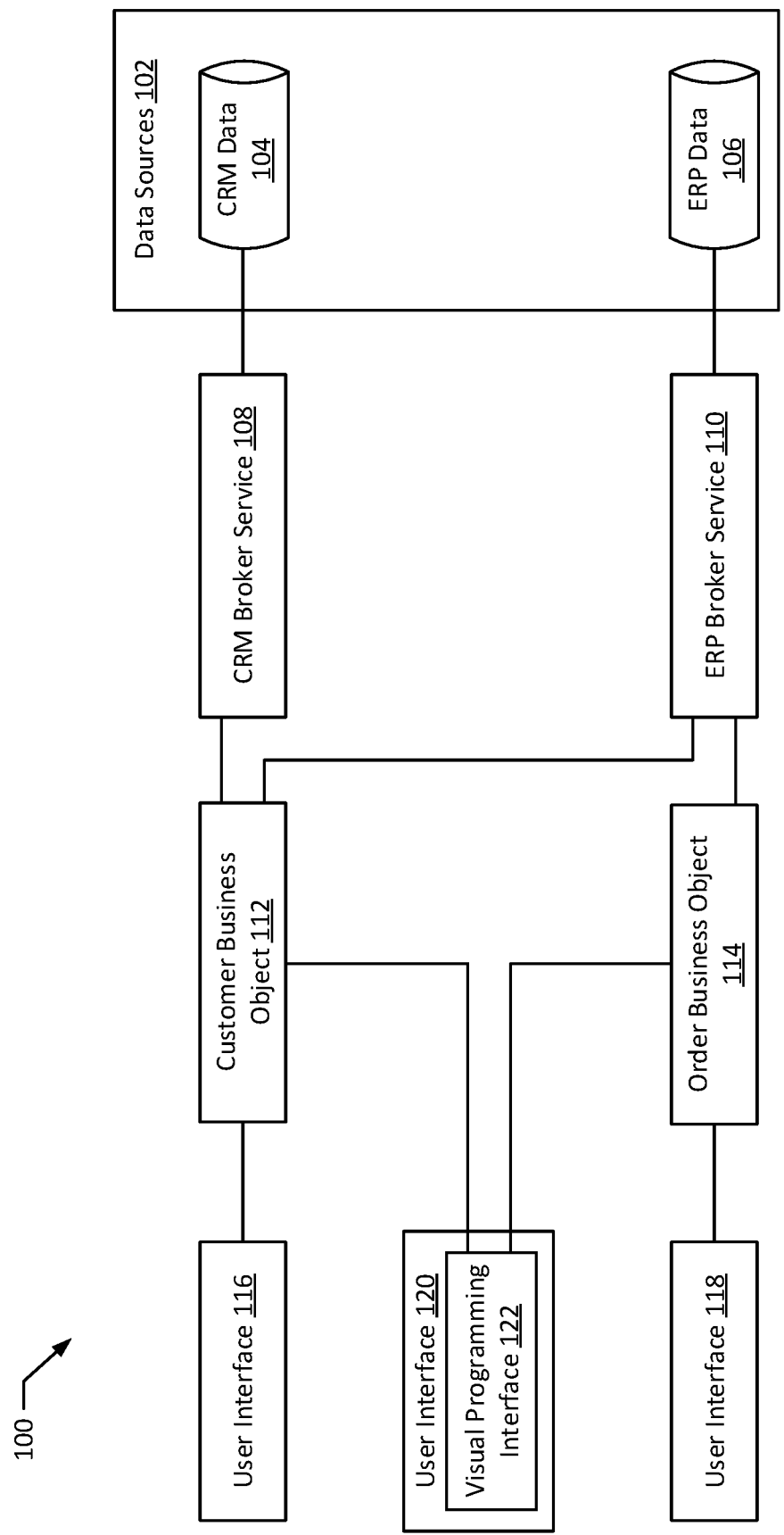
FIG. 1 illustrates a business object environment that retrieves and processes data from data sources according to an exemplary embodiment of the present disclosure.

FIG. 1 illustrates a business object environment 100 that uses broker services to retrieve and process data from data sources according to exemplary embodiments of the present disclosure. The business object environment 100 includes data sources 102, which may include different types of data stored on the same data storage, different data storages, or combinations thereof. For example, as depicted, the data sources 102 include customer relationship management (CRM) data 104 and enterprise resource planning (ERP) data 106. The ERP data 106 may be received from one or more ERP applications and/or data storages and may include information regarding sales data, financial data, product manufacturing data, inventory data, product service data, customer service data, human resources data, purchasing data, materials resource planning data, and the like. The CRM data 104 may be received from one or more CRM applications and/or data storages and may include information regarding customer contacts, customer documents, marketing data, marketing outreach (e.g., sales calls, email outreach, in-person visits), and the like.

Broker services 108, 110 connect to the data sources 102. Specifically, a CRM broker service 108 connects to the CRM data 104 and an ERP broker service 110 connects to the ERP data 106. The broker services 108, 110 may be configured to expose properties and methods of the data sources 102 as standardized properties and/or methods used by business objects 112, 114 within the business object environment 100. For example, each of the data sources 102 may have different methods or properties that can be used to retrieve or manipulate data within the data sources 102 and may differ from methods or properties that can be used with business objects 112, 114. For example, methods within the data sources 102 may have a different syntax or process of calling or configuring the methods than that used by the business objects 112, 114. Accordingly, the broker services 108, 110 may be configured to translate between the syntax used by the business objects 112, 114 and the syntax used by the data sources 102. In particular, the data sources 102 may include one or more types of data storages, such as relational databases, SQL databases, NoSQL databases, network databases, object-oriented databases, hierarchical databases, and the like. Furthermore, the data sources 102 may communicate using one or more different communications protocols, such as hypertext transfer protocol (HTTP), advanced message queuing protocol (AMQP), message queuing telemetry transport (MQTT), extensible messaging and presence protocol (XMPP), and the like. In one example, the CRM data 104 may be received from a relational database that communicates using AMQP and the ERP data 106 be received from an SQL database that communicates using MQTT. In another example, enterprise content management (ECM) information and files may be received from blob storage that communicates using HTTP.

The business objects 112, 114 may then connect to one or more of the broker services 108, 110. For example, different business objects 112, 114 may correspond to different user interfaces 116, 118. For example, the business object environment 100 includes a customer business object 112 corresponding to user interface 116 and an order business object 114 corresponding to a user interface 118. Each of the user interfaces 116, 118 may correspond to a different user interface (e.g., screen, page, or other discrete user interface). Additionally or alternatively, each of the user interfaces 116, 118 may correspond to a different user interface element (e.g., form on a page, interactive field). The different user interfaces 116, 118 may correspond to different types of data (e.g., may display or manipulate different types of data). For example, the user interface 116 may be configured to display and manipulate data relating to customers and the user interface 118 may be configured to display or manipulate data relating to orders. Accordingly, the customer business object 112 corresponding to the user interface 116 may communicate with both the CRM broker service 108 and the ERP broker service 110 to access and/or manipulate the CRM data 104 and/or the ERP data 106. Continuing the previous example, the customer business object 112 may receive data from two data storages using two different types of data storages (e.g., a relational database for the CRM data 104 and an SQL database for the ERP data 106) that utilize two different communication protocols (e.g., AMQP and MQTT). Also, the order business object 114 may communicate with the ERP broker service 110 to access and/or manipulate the ERP data 106. As a specific example, the ERP data 106 and the CRM data 104 may include the properties and methods indicated in Table 1 below.

TABLE 1

Exemplary Properties and Methods
for ERP Data 106 and CRM Data 104

| | ERP Data 106 | CRM Data 104 |
|---|---|---|
| Properties | OrderNumber | CustomerID |
| | OrderDate | Name |
| | OrderTime | Address |
| | CustomerID | |
| | OutstandingBalance | |
| | Total | |
| | Status | |
| Methods | CreateOrder | LoadContact |
| | LoadOrders | UpdateContact |
| | UpdateOrder | |
| | DeleteOrder | |
| | LoadBalance | |
| | UpdateBalance | |

In such instances, the customer business object 112 may combine a subset of the properties and methods for the ERP data 106 and the CRM data 104 and the order business object 114 may include a subset of the properties and methods for the ERP data 106. As a specific example, the customer business object 112 and the order business object 114 may include the properties and methods indicated in Table 2 below.

TABLE 2

Exemplary Properties and Methods
for ERP Data 106 and CRM Data 104

| | Customer Business Object 112 | Order Business Object 114 |
|---|---|---|
| Properties | CustomerID | OrderNumber |
| | Name | CustomerID |
| | Address | |
| | OutstandingBalance | |
| Methods | LoadBalance | CreateOrder |
| | UpdateBalance | LoadOrders |
| | LoadContact | UpdateOrder |
| | UpdateContact | DeleteOrder |

The business objects 112, 114 may then be used to create, populate, and/or update the user interfaces 116, 118. For example, the user interface 116 may be used to retrieve customer information (e.g., CustomerID, Name, Address) using the LoadContact method and/or to update the customer information using the UpdateContact method. Furthermore, the user interface 116 may be used to retrieve or update the Outstanding Balance for a particular customer using the LoadBalance and UpdateBalance methods. As another example, the user interface 118 may be used to retrieve or manipulate existing orders (e.g., existing Order-Numbers) using the LoadOrders, UpdateOrder, and DeleteOrder methods. Furthermore, the user interface 118 may be used to create new orders (e.g., new OrderNumbers) using the CreateOrder method.

In this way, the business objects 112, 114 may be used to collect and present methods and properties from different data sources via the broker services 108, 110. Furthermore, the customer business objects 112, 114 and/or the user interfaces 116, 118 may be configurable by a user using one or more visual programming languages. For example, the business object environment 100 includes a user interface 120 (e.g., a graphical user interface) that includes a visual programming interface 122. The visual programming interface 122 may be used to configure the business objects 112, 114. For example, the visual programming interface 122 may be used to link the business objects 112, 114 to particular broker services 108, 110 (e.g., to particular properties and/or methods within the broker services 108, 110. Additionally or alternatively, the visual programming interface 122 may be used to configure the user interfaces 116, 118. For example, the visual programming interface 122 may be used to create a layout for any forms, pages, and the like included within the user interface 116, 118 and to identify which properties and/or methods are to be used in generating and displaying the user interfaces 116, 118.

Additional information regarding broker services and business objects for connecting to data sources is available in U.S. Pat. No. 8,239,226 and U.S. application Ser. No. 12/117,455, which are incorporated by reference.

However, as described above, business objects 112, 114 and broker services 108, 110 may typically be configured to interact with data sources, such as data storages. However, other sources of information may be useful in a business setting. For example, other information may be useful for use in generating or updating user interfaces 116, 118. As another example, other information sources may be useful in generating alerts, or in triggering the performance of other actions. In one particular example, it may be beneficial to receive and process events from various event sources. For example, events may be made available using secure publish/subscribe (e.g. "pubsub") protocols or processes. As a specific example, events may be transmitted from various sources using the hypertext transfer protocol (HTTP) according to secure webhook pubsub procedures.

Existing systems to receive and process events may not be compatible with business object environments. In particular, as explained above, existing broker services may be configured to retrieve and store data from data sources, which may typically rely on actions from the business objects 112, 114 to trigger further processing. However, utilizing event sources may enable business objects to receive and respond to events that are broadcast. Such systems may enable faster (e.g., real-time) responses to the occurrence of events received from event sources, allowing for more responsive systems that still capitalize on the ease-of-use and interoperability of business objects. Furthermore, data included within events may be received in formats or fields that do not correspond to properties usable by business objects, or that are in a format incompatible with existing business object features (e.g., methods, workflows). Therefore, there exists a need to receive events from event sources and to prepare data within received events for use in business object systems.

One solution to this problem is to create business object event sources configured to receive events from event sources and to translate the events into business object events that can be used by business objects within the business object environment. For example, the business object event sources may translate data within data fields of received events into corresponding properties of the business object environment according to a translation function. The translated data may be collected into business object events that are then provided to business objects for further processing. In certain instances, the business object event sources may aggregate data from multiple events to form a single business object event. An additional or alternative instances, the business object event sources may create multiple business objects.

Figure 2:
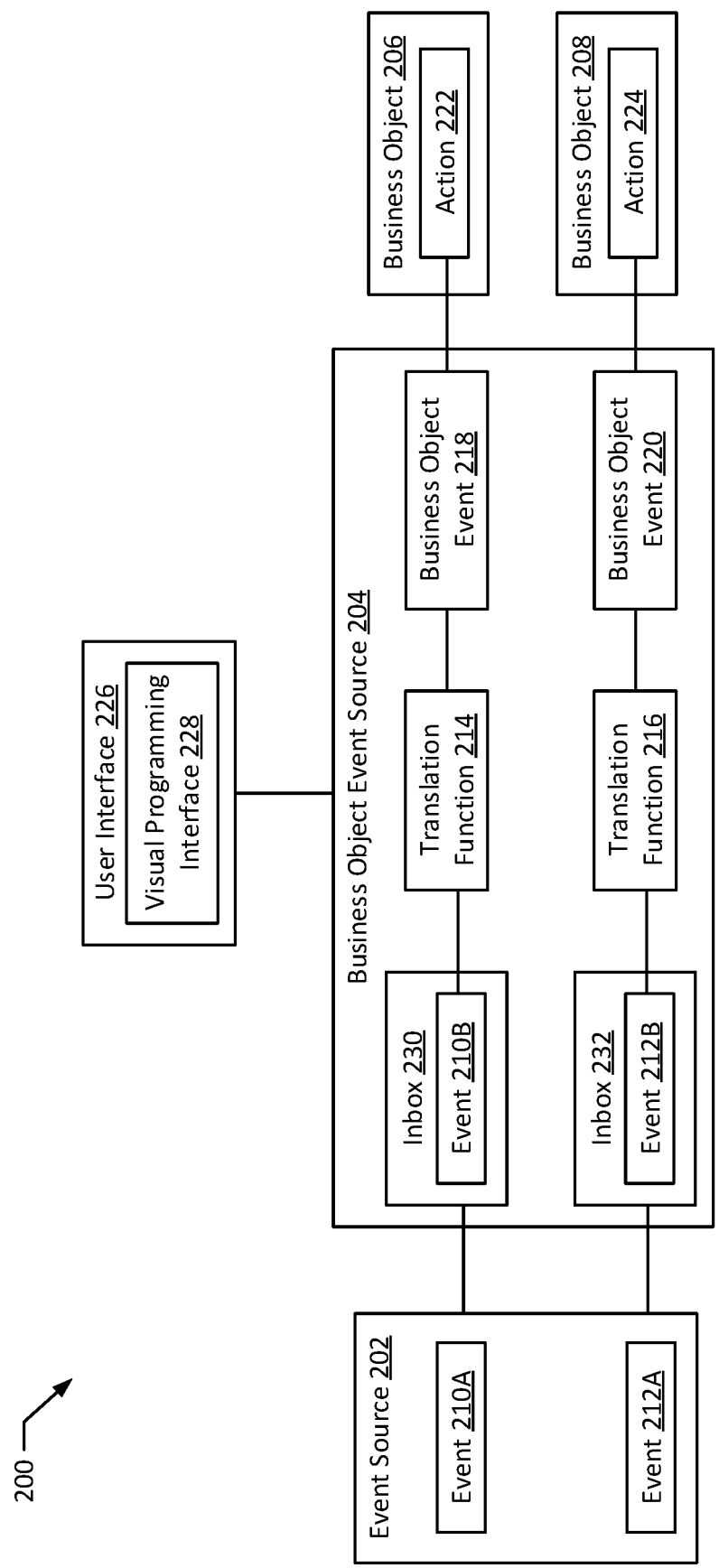
FIG. 2 illustrates a system that uses a business object event source to receive and process events from event sources according to an exemplary embodiment of the present disclosure.

FIG. 2 illustrates a system 200 that uses a business object event source to receive and process events from event sources according to an exemplary embodiment of the present disclosure. Specifically, the system 200 includes an event source 202, a business object event source 204, business objects 206, 208, and a user interface 226.

The event source 202 may be a server or other computing system configured to publish, transmit, or broadcast events upon the occurrence of particular tasks (e.g., the completion of particular tasks, the execution of particular functions, executable code, and the like). For example, the event source 202 may transmit events as one or more HTTP packets that specify the type of event and corresponding information for the particular event occurrence that triggered the transmission of the event. In certain implementations, the event source 202 may be configured to transmit events upon the occurrence of at least one of a new order being received, inventory being updated, a bill being paid by a customer, occurrence of a particular date or time, a new data storage entry being added, a new customer relationship added (e.g., to a CRM database), a new mailing list sign up, a new employee added (e.g., to an ERP database), an employee being removed or terminated (e.g., from an ERP database), a changing employee role (e.g., in an ERP database), and the like. In light of the present discussions, one skilled in the art may recognize one or more additional events or event sources that may be used with the presently discussed techniques. All such events and event sources are accordingly considered within the scope of the present disclosure. The event source 202 may be accessible at particular addresses. For example, the event source 202 may be accessible using universal resource locators (e.g., URLs) containing particular host names or domain names. Additionally or alternatively, the event source 202 may correspond to a particular path or subdomain within a particular hostname or domain name.

The event source 202 may publish events by broadcasting the events as the corresponding tasks occur. For example, the event source 202 may be communicatively coupled to a CRM system. A new customer may be added to the CRM database and the event source 202 or a process within the CRM system may detect that the new customer is added. In response, the event source 202 may create the event (e.g., as an HTTP packet, as a web socket packet) identifying one or more of the CRM system, the new customer (e.g., name, contact information), and a time at which the new customer was added. The event source 202 may then "push" the event by publishing or transmitting the event to one or more subscribed computing devices, which may include the business object event source 204 (e.g., a subscribed inbox of the business object event source or the system 200.

Additionally or alternatively, the event source 202 may store new events and users may pull data corresponding to the new events as needed or requested. For example, the event source 202 may be communicatively coupled to an ERP system. A new order may be added to an order data storage of the ERP system and the event source 202 or a process within the ERP system may detect that the new order has been added. In response, the pull event source 204 may create an event (e.g., as an HTTP packet) that identifies the ERP system, the order added to the order data storage (e.g., an order identifier), a time at which the order was added to the order data storage, order information (e.g., products purchased, quantity purchased), and the like. The event source 202 may store the event for retrieval by other computing devices. The event source 202 may receive a request from a subscribed computing device, such as the business object event source 204, and may provide the new event and any other new events to the subscribed computing device. In certain instances, the event source 202 may only provide events to subscribed computing devices that the subscribed computing devices have not yet received. For example, the event source 202 may store IP addresses or other computing device identifiers in association with particular events (e.g., the most recent event that a corresponding computing device has received). Additionally or alternatively, the event source 202 may receive an indication of the most recent event received and may transmit all subsequent events.

The business object event source 204 and may be configured to receive events from the event source 202 and to prepare the events 210A, 212A for use by the business objects 206, 208. In particular, the business object event source 204 may create business object events 218, 220 based on events 210A, 212A generated by and received from the event source 202. For example, the business object event source 204 may receive events 210B, 212B (which may be copies of the events 210A, 212A) from the event source 202 at one or more inboxes 230, 232. The events 210B, 212B may be translated according to one or more translation functions 214, 216 to generate the business object events 218, 220. After being generated, the business object events 218, 220 may be provided to the business object 206, 208.

The inboxes 230, 232 may be configured to connect to particular event sources 202 (e.g., via local network connections such as local area networks and/or via external network connections such as the Internet). For example, the inboxes 230, 232 may be an endpoint (e.g., an HTTP endpoint, a websocket endpoint) subscribed to the event source 202. In certain implementations, the business object event source 204 may include separate inboxes 230, 232 for different types of events 210B, 212B created and transmitted by the event source 202. In one specific example, the inbox 230 may subscribe to events 210A-B from the event source 202 (e.g., order received events) and the inbox 232 may subscribe to events 212A-B from the event source 202 (e.g., order fulfilled events). Exemplary events are discussed in greater detail below in connection with FIG. 4. It should be understood that other configurations for the inboxes 230, 232 may be utilized. For example, a single inbox 230 may receive events 210A-B, 212A-B of different types from the same event source 202. As another example, the business object event source 204 may include one or more inboxes 230, 232 that receive events 210A-B, 212A-B from a first event source 202 and one or more inboxes that receive events from a second event source (not depicted). In still further implementations, the business objects event source 204 may include multiple inboxes 230, 232 that receive events 210A-B of the same type from an event source 202. Receiving events and communications between event sources and inboxes are discussed further in U.S. application Ser. No. 17/086,649, filed Nov. 2, 2020, and titled "EVENT REGISTRATION FOR BUSINESS OBJECTS", which is incorporated by reference. For example, the business object event source 204 (and any other business object event source discussed herein) may be an exemplary implementation of an event broker service as discussed in U.S. application Ser. No. 17/086,649.

The translation functions 214, 216 may specify how to generate business object events 218, 220 based on events 210B, 212Be received from the event source 202. For example, the translation functions 214, 216 may include a mapping between data fields of received events 210B, 212B and one or more properties utilized by the business objects 206, 208. Furthermore, the translation functions 404 may identify one or more properties that are used to create particular business object events 218, 220. For example, different types of business object events 218, 220 may be created based on different types of events 210B, 212B received from the event source 202. Additional details regarding translation functions and corresponding mappings are discussed below in connection with FIG. 4. It should also be understood that different configurations of business object events 218, 220 and events 210B, 212B may be possible. In certain instances, in certain implementations, one or more of the translation functions 214, 216 may map between a single event 210B, 212B and multiple business object events 218, 220. As a specific example, a single event 210B may be received identifying a file that has been updated in a storage system and a folder containing the updated file. The translation function 214 may map between the event 210B and two business object events 218 including a first business object event describing the file update and a second business object event identifying the folder containing an updated file. In further instances, one or more of the translation functions 214, 216 may map between multiple events 210B, 212B and a single business object event 218, 220. As a specific example, multiple events 212B may be received from the event source 202 concerning an updated file (e.g., events exchanged according to a secure web with authenticated callback communication flow). The translation function 216 may map between data contained within the multiple events 212B and a single business object event 220 indicating that a file has been updated. In still further instances, one or more of the translation functions 214, 216 may map between multiple events 210B, 212B and multiple business objects events 218, 220. Continuing the previous example, the translation function 216 may also map between data contained within the multiple events 212B and another business object event indicating a folder containing the file that was updated.

The business objects 206, 208 may be exemplary implementations of business objects within a business object environment. For example, the business object events 206, 208 may be exemplary implementations of the customer business object 112 and/or the order business object 114. The business objects 206, 208 may be configured to perform one or more actions 222, 224 in response to receiving particular business object events 218, 220 from the business object event source 204. The actions 222, 224 may include one or more of performing a method of the business objects 206, 208, performing a workflow (e.g., executing a workflow, such as a user-configured workflow to send an email, based on contents of the business objects 206, 208), and/or updating a property of the business object 206, 208. Additional, specific examples of actions 222, 224 are discussed in further detail below. Although the business objects 206, 208 are depicted with a single action 222, 224 corresponding to the business object events 218, 220, in certain implementations the business objects 206, 208 may be configured to perform more than one action 222, 224 in response to received business object events 218, 220. Additionally or alternatively, actions 222, 224 performed by the business objects 206, 208 may depend on more than one business object event 218, 220 received from the business object event source 204. In still further implementations, data from other data sources (e.g., the data sources 102) may be combined with data from the business object events 218, 220 to execute the actions 222, 224.

The user interface 226 and the visual programming interface 228 may be used to configure the business object event source 204 and/or one or more of the business objects 206, 208. In certain instances, the user interface 226 and the visual programming interface 228 may be implemented similar to the user interface 120 and the visual programming interface 122. The visual programming interface 228 may be used to create or configure business object event sources 204. For example, the visual programming interface 228 may be used to identify event sources 202, to create or update inboxes 230, 232 that subscribe to identify event sources, to create or update translation functions 214, 216, and/or to create or update business object events 218, 220. The visual programming interface 228 may also be used to create or update business objects 206, 208. For example, the visual programming interface 228 may be used to create or update actions 222, 224 performed by the business objects 206, 208. Additionally or alternatively, the visual programming interface 228 may be used to associate particular actions 222, 224 with particular types of business object events 218, 220 received from the business object event source 204. In additional or alternative implementation, alternative interfaces may be used to create or update actions 222, 224. For example, conventional, code-based (or text-based) programming interfaces may be used to create or update actions 222, 224 and/or to associate actions 222, 224 with the receipt of particular types of business object events 218, 220.

As depicted, the business object event source 204 is separate from the business objects 206, 208. In such implementations, the business object event source 204 may be implemented separately (e.g., as a separate computing process, on a separate computing device) from the business objects 206, 208. However, in certain alternative implementations, the business object event source 204 may be implemented as part of a business object 206, 208. For example, the business object 206 may include the inbox 230, the translation function 214, and the business object events 218. As another example, the business object 208 may include the inbox 232, the translation function 216, and the business object event 220. Furthermore, at least a portion of the system 200 may be included within a business object environment, such as the business object environment 100. For example, the business object event source 204, the business objects 206, 208, and the user interface 226 may be included within the business object environment. In certain implementations, the event source 202 may also be included within the business object environment.

As depicted in FIG. 2 and discussed above, the inboxes 230, 232 are implemented within the business object event source 204. It should be appreciated that, in additional or alternative implementations, the inboxes 230, 232 may be implemented external to the business object event source 204. For example, the inboxes 230, 232 may be implemented as external components and/or external software processes to the business object event source 204 within the system 200.

One or more of the event source 202, the business object event source 204, the business objects 206, 208, and the user interface 226 may be implemented by a computing system. For example, although not depicted, one or more of the event source 202, the business object event source 204, the business objects 206, 208, and the user interface 226 may include a processor and a memory that implement at least one operational feature. For example, the memory may contain instructions which, when executed by the processor, cause the processor to implement at least one operational feature of the event source 202, the business object event source 204, the business objects 206, 208, and the user interface 226.

Similarly, the business object environment may be implemented by one or more computing systems. For example, one or more of the data sources 102, the broker services 108, 110, the business objects 112, 114, and the user interfaces 116, 118, 120 may be implemented by one or more computing systems. For example, although not depicted, one or more of the data sources 102, the broker services 108, 110, the business objects 112, 114, and the user interfaces 116, 118, 120 may contain a processor and a memory that implements at least one operational feature. As another example, the memory may contain instructions which, when executed by the processor, cause the processor to implement the at least one operational feature.

Figure 3:
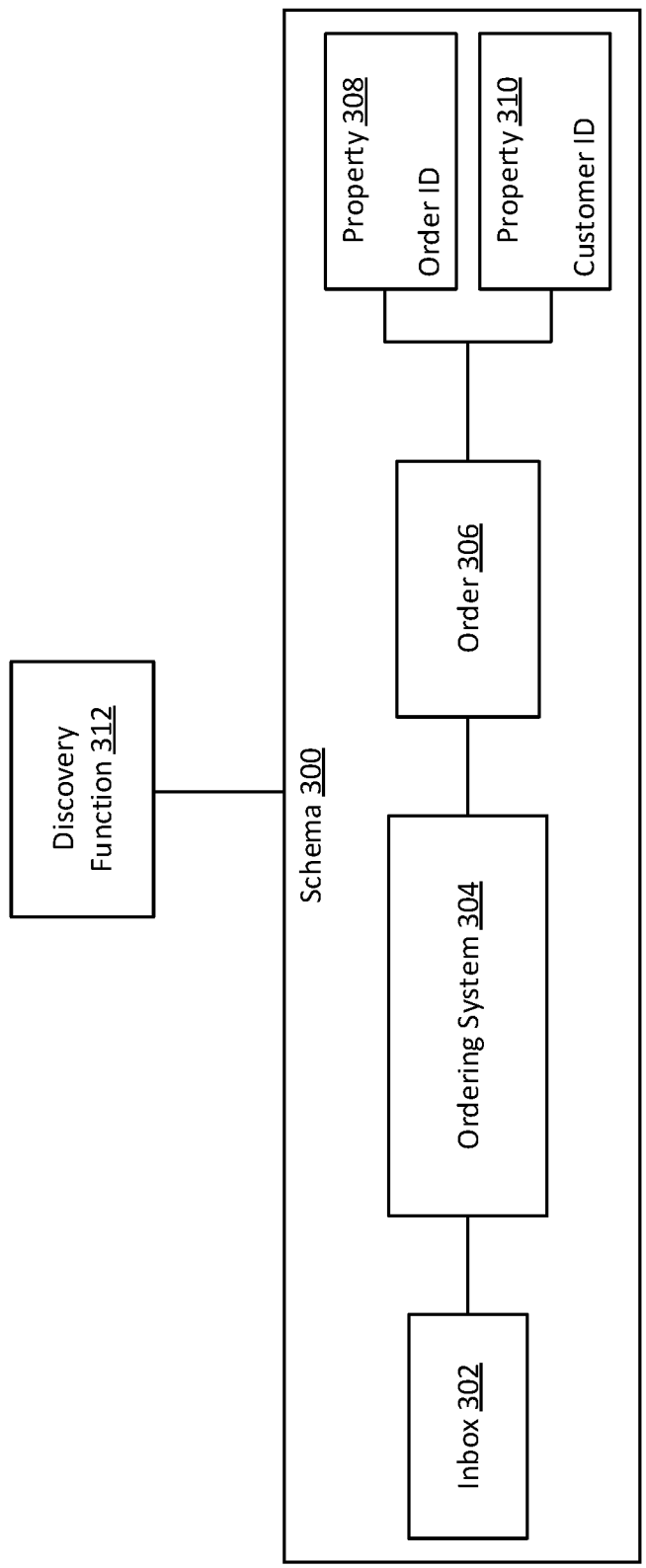
FIG. 3 illustrates a schema according to an exemplary embodiment of the present disclosure.

FIG. 3 illustrates a schema 300 according to an exemplary embodiment of the present disclosure. The schema 300 may be used to create a business object event source 204. In particular, the schema 300 may be used by a business object environment (e.g., via a visual programming interface 228) to describe business objects 206, 208 and other components of the business object environment when creating business object event sources 204 within the business object environment.

The schema 300 may be determined using a discovery function 312 configured to execute within the business object environment that contains the business objects 206, 208 for which business object events 218, 220 may be created by the business object event source 204. For example, the discovery function 312 may execute within the business object event source 204 when the business object event source 204 is initially created within the business object environment. As another example, the discovery function 312 may execute within the business object environment (e.g., within a business object 206, 208) executing within the business object environment. As a still further example, the discovery function 312 may execute within the user interface 226 used to create the business object event source 204 (e.g., a visual programming interface 228) or a computing device implementing the user interface 226.

The discovery function 312 may be configured to identify business objects within the business object environment (e.g., connected to particular data stores within the business object environment). The discovery function 312 may further identify data structures of the data utilized by the business objects from the data sources. For example, the discovery function 312 may identify methods and properties of the data sources that are used by business objects connected to the data sources. The discovery function 312 may then create the schema 300 to indicate the properties and other types of data that are used by the business objects within the business object environment.

The schema 300 may be an exemplary implementation of a schema created by the discovery function 312. For example, the business object environment may include an ordering system 304 configured to receive orders from customers. For instance, the ordering system 304 may receive orders from customers at the inbox 302 (e.g., as HTTP packets or other data structures received via a website or other Internet ordering platform). Information regarding received orders (e.g., order identifiers, customer identifiers, order dates, price, products purchased) may be stored within the ordering system 304. In particular, the ordering system 304 may store orders 306 with particular properties 308, 310 reflecting different types of data or data fields within the orders 306. As depicted, the properties 308, 310 include an order ID property 308 and a customer ID property 310.

In practice, it should be understood that orders 306 or other types of data may in practice have many more than two properties 308, 310. Additionally or alternatively, data storage systems, such as the ordering system 304, may, in practice, store more than one type of data. For example, the ordering system 304 may store additional types of data in addition to orders 306 (e.g., product information, customer information). Furthermore, in certain implementations, schemas 300 may include more than one data storage system. For example, in addition to the ordering system 304, the schema 300 may include a CRM system.

Figure 4:
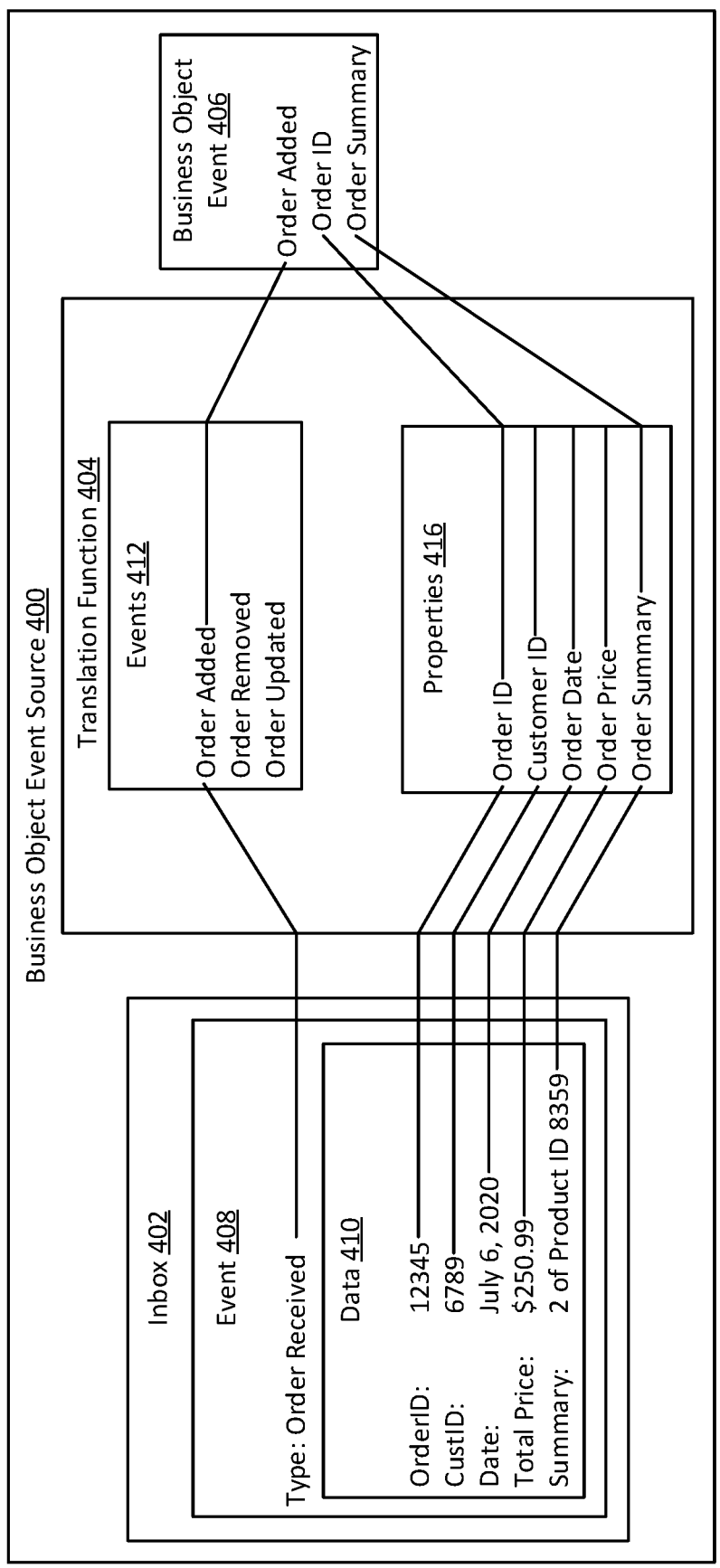
FIG. 4 illustrates a business object event source according to an exemplary embodiment of the present disclosure.

FIG. 4 illustrates a business object event source 400 an according to exemplary embodiment of the present disclosure. The business object event source 400 may be an exemplary implementation of the business object event source 204. The business object event source 400 includes an inbox 402, a translation function 404, and a business object event 406. The inbox 402 may be an exemplary implementation of at least one of the inboxes 230, 232, the translation function 404 may be an exemplary implementation of at least one of the translation functions 214, 216, and the business object event 406 may be an exemplary implementation of at least one of the business object events 218, 220.

The inbox 402 may be configured to receive events 408 from event sources 202. In particular, when the inbox 402 is created, the inbox 402 may be subscribed to an event source 202 as an endpoint (e.g., an HTTP endpoint) of the event source 202. Once subscribed, the inbox 402 may receive events 408 from the event source 202 as the events are created (e.g., for a push event source) and/or may retrieve events 408 from the event source 202 (e.g., for a pull event source). In certain instances, the inbox 402 may be implemented within the business object event source 400 as depicted and/or may be implemented separate from the business object event source 400 (e.g., as an external software process within the system 200).

The event 408 stores data 410, which may reflect information regarding an occurrence that triggered the creation and transmission of the event 408. The event 408 may also specify a type of the event. For example, the event 408 is an order received event, which may be generated and transmitted (e.g., by an ordering system 304) in response to receiving a new order from a customer. The data 410 may include multiple data fields, which may include a field name (e.g., OrderID, CustID, Date, Total Price, Summary) and contents for each data field (12345, 6789, "Jul. 6, 2020", $250.99, "2 of Product ID 8359"). In particular, the inbox 402 may receive the event 408 as a packet (e.g., an HTTP packet) storing the data 410 in a JSON format. As a specific example, the data 410 may be stored as:

"orders": [
{
  "orderno": "12345",
  "custid": "6789",
  "date": "Jul. 6, 2020",
  "total": "$250.99",
  "summary": "2 of Product ID 8359"
}
]

The event 408 and the data 410 may be generated to specifically identify and at least partially describe an occurrence of a particular type of event (e.g., an occurrence of receiving a new order). For example, as depicted, the data 410 specifies an orderID and a custID that specifically identify the order received in the customer who placed the order. However, additional data regarding the occurrence of the events (e.g., the received order) may still be stored in a data store, such as the ordering system 304. In such instances, data stored within the data store may be queried later. For example, the data may be queried by the business object event source 400 when creating the business object event 406. As another example, the data may be queried by a business object receiving the business object event 406 when performing a corresponding action.

The translation function 404 may provide a mapping between data fields within the data 410 and properties 416. The properties 416 may be identified based on a schema 300. For example, based on the schema 300, it may be determined that business objects that receive and process data from the ordering system 304 utilize an order ID property 308, a customer ID property 310, and/or one or more additional properties. Accordingly, the properties 416 included within the translation function 404 include an Order ID and a Customer ID. The mappings between the data 410 and the properties 416 may specify which data fields within the data 410 correspond to which properties 416. For example, the OrderID data field corresponds to the Order ID property, the CustID data field corresponds to the Customer ID property, the Date data field corresponds to the Order Date property, the Total Price data field corresponds to the Order Price property, and the Summary data field corresponds to the Order Summary property. The translation function 404 also includes a mapping from the type of the event 408 and different events 412. In particular, the mapping indicates that the order received event corresponds to an order added event. The events 412 may be used to specify the type of business object event 406 that is created. For example, the translation function 404 also maps the order added event to a corresponding business object event 406. The translation function 404 may also specify one or more properties to be included within the business object 406. In particular, the translation function 404 includes mappings between the order ID property and the business object event 406 and between the order summary property and the business object event 406.

In certain instances, data provided in a data field of the event 408 may be translated from one format within the data 410 to another format used by the properties 416, as described above. For example, certain properties 416 may specify particular formats for dates (e.g., "Month Day, Year", MM/DD/YYYY, DD/MM/YYYY, DDMMYY, UTC format), times (e.g., AM/PM format, 24-hour format, UTC format), numerical values (e.g., integers, floats), and the like. As a specific example, the order date property may use the MM/DD/YYYY format for the date, which differs from the "Month Day, Year" format for the date field in the data 410. Accordingly, the translation function 404 may include a mapping between the MM/DD/YYYY and "Month Day, Year" formats such that business object events that include the order date property (not depicted) receive the information in the correct format.

The mapping provided by the translation function 404 may be determined based on one or more user-specified mappings between data fields of events 408 and the properties 416. Additionally or alternatively, the mapping may be determined at least in part based on the names of data fields within events 408. For example, a similarity measure may be calculated between names of data fields and names of the properties 416 and a mapping may be created between data fields and properties 416 with similarity measures that exceed a predetermined threshold. In still further implementations, events 408 may specify corresponding properties 416 (e.g., by uniquely identifying corresponding properties, such as by name or reference number). In certain instances, events created within the same computing system and/or computing environment as the business object event source 400 (e.g., by internal computing processes of a computing system implementing the business object event source 400) may not require an inbox 402 and/or a translation function 404. For example, events created by internal sources may be prepared to include corresponding business object events 406 that can be directly extracted and provided to business objects. As another example, events created by internal sources may include properties that directly correspond to (e.g., may have the same names and formats as) properties 416 to include within a corresponding business object event 406.

The business object event 406 may be created based on received events 408 according to the mappings specified in the translation function 404. For example, each time an order received event 408 is received, a corresponding business object 406 may be created that includes the order ID property (e.g., the contents of the OrderID data field) and the order summary property (e.g., the contents of the Summary data field). Once created, the business object event 406 may be provided to (e.g., transmitted to) business objects, which may execute one or more actions in response. For example, in response to receiving the business object event 406, a business object may create and send an email to order fulfillment personnel at an order fulfillment facility (e.g., a shipping warehouse) so that the order fulfillment personnel can prepare and ship the order to a customer. Prior to sending the email, the business object may retrieve additional information from the ordering system 304 or another data store. For example, the business object may retrieve a shipping address associated with the Order ID from the ordering system 304. Additionally or alternatively, the business object event source 400 may retrieve the shipping address from the data store and may include the shipping address within the business object event 406.

As depicted, a single event 408 corresponds to a single business object event 406. However, in additional or alternative implementations, the translation function 404 may specify two or more business object events 406 for a received event 408. For example, in addition to the business object event 406, the translation function 404 may specify a second business object event that is to be created for order received events 408. The second business object event may include the customer ID property and the order price property. In response to receiving the second business object event, a business object may create an email to customer support or sales personnel to confirm that the order was submitted.

As discussed above and depicted in FIG. 4, the business object event source 400 receives and processes order received events from an ordering system. It should be understood that, in practice, the business object event source 400 or a similar business object event source may be used to receive and process other types of events. For example, events may be received when various types of data are created, updated, deleted, and the like. For example, events may be received with teams, users (or members), orders, customers, customer relationships, support requests, emails, products, services, and the like, are created, updated, deleted, archived, unarchived, or similar within a data store or other computing system.

Figure 5:
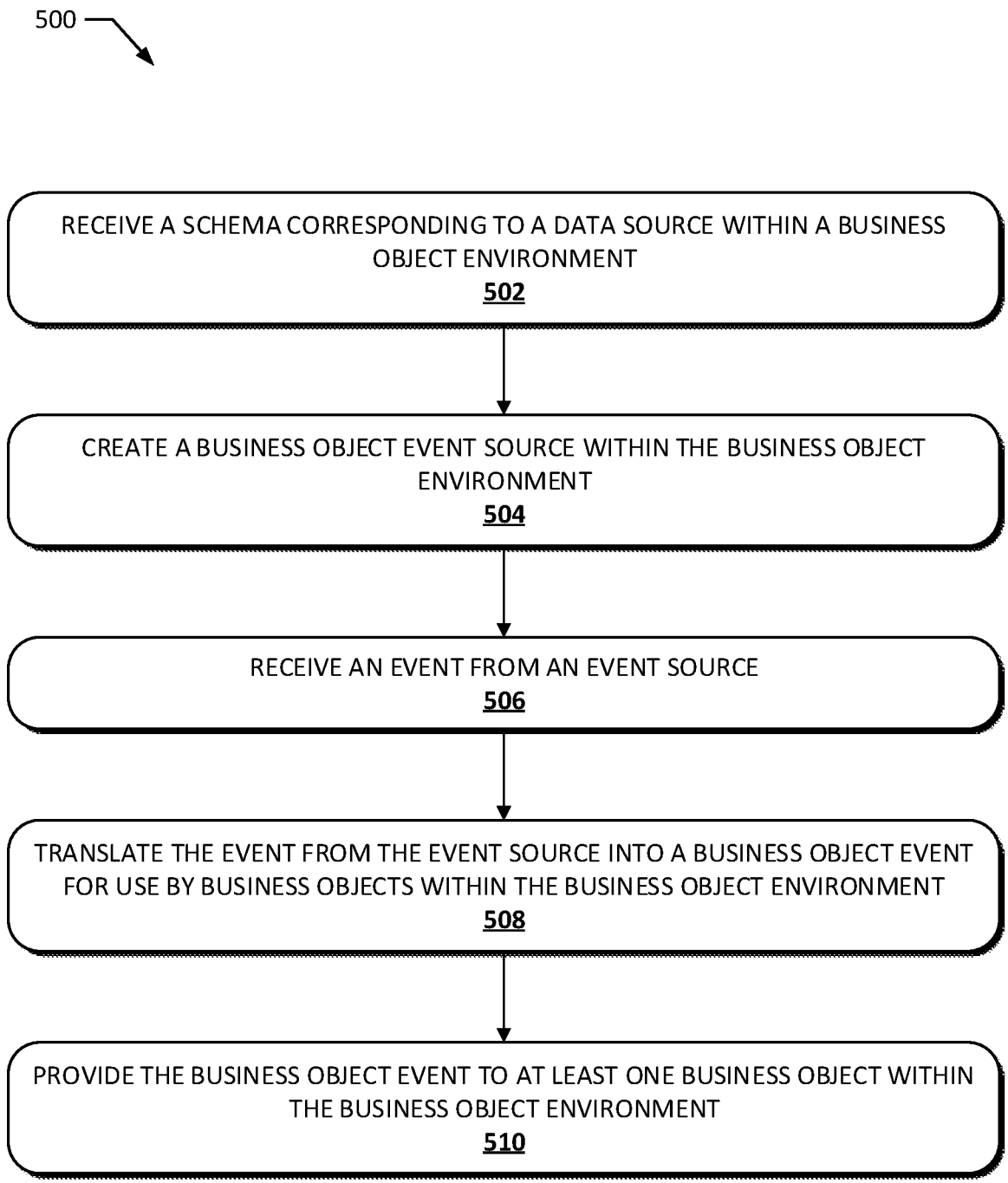
FIG. 5 illustrates a flowchart of a method for creating and using a business object event source according to an exemplary embodiment of the present disclosure.

FIG. 5 illustrates a flowchart of a method 500 for creating and using a business object event source according to an exemplary embodiment of the present disclosure. The method 500 may be implemented on a computer system, such as the system 200. For example, the method 500 may be implemented at least in part by one or more business objects 206, 208, one or more business object event sources 204, and/or one or more event sources 202. The method 500 may also be implemented by a set of instructions stored on a computer-readable medium that, when executed by a processor, cause the computer system to perform the method 500. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with receiving a schema corresponding to a data source within a business object environment (block 502). For example, a schema 300 may be received by a computing device implementing at least a portion of the business object environment (e.g., a computing device creating a business object event source 204, 400 and/or implementing a visual programming interface 228 used to create the business object event source 204, 400. The schema 300 may include information regarding a data source, such as the data sources 102 and/or the ordering system 304. The schema 300 may describe how information is stored within the data system. For example, the schema 300 may identify types of data (e.g., orders 306) and/or properties 308, 310 of data stored within the data source. The schema 300 may be received from a discovery function 312 executing within the business object environment. Additionally or alternatively, the computing device that receives the schema 300 may execute the discovery function 312 to generate the schema 300.

A business object event source may be created within the business object environment (block 504). For example, a business object event source 204, 400 may be created within the business object environment for which a schema 300 was received. In particular, the business object event source 204, 400 may be created to receive and process events from an event source 202. As explained above, the business object event source 204, 400 may include an inbox 230, 232, 402 and/or a translation function 214, 216, 404. The inbox 230, 232, 402 may receive events 210B, 212B, 408 from an event source 202. The translation function 214, 216, 404 may be used to create business object events 218, 220, 406 based on the received events 210B, 212B, 408. In certain instances, the business object event source 204, 400 may be created at least in part based on a request received from a user (e.g., via a visual programming interface 228).

An event may be received from the event source (block 506). For example, the business object event source 204, 400 may receive an event 210B, 212B, 408 at the inbox 230, 232, 402. In particular, the inbox 230, 232, 402 may be subscribed to the event source 202 as an endpoint of the event source 202 and may receive events 210B, 212B from the event source as they are created and broadcast. As explained above, the event 210B, 212B, 408 may be received containing data 410 (e.g., as an HTTP packet containing a JSON file storing the data 410).

The event received from the event source may be translated into a business object event (block 508). For example, the business object event source 204, 400 may translate the received event 210B, 212B, 408 into a business object event 218, 220, 406 for use by business objects 206, 208 within the business object environment. In particular, the business object events 218, 220 may be translated according to one or more properties 416 utilized by the business objects 206, 208. For example, the properties 416 may be determined as one or more properties included within the schema 300. The event 210B, 212B, 408 may be translated according to the translation function 214, 216, 404. For example, the translation function 214, 216, 404 may include a mapping between received events 210B, 212B, 408 and business object events 218, 220, 406 created by the business object event source 204, 400. For example, the translation function 214, 216, 404 may map data 410 to properties 416 identified by the schema 300. The properties 416 may then be used to create one or more business object events 406. For example, the translation function 214, 216, 404 may identify one or more corresponding business object events 218, 220, 406 for each type of events 210B, 212B, 408 received by the business object event source 204, 400. The business object event 406 may be created to include one or more of the properties 416 (e.g., corresponding contents of the data 410 for one or more corresponding properties 416) identified by the schema 300. For example, the translation function 214, 216, 404 may be prepared, based on the schema 300, to translate corresponding contents of the data 410 into formats (e.g., a data format) and properties utilized by the business objects 206, 208.

The business object event may be provided to at least one business object within the business object environment (block 510). For example, the business object event source 204, 400 may provide the business object event 218, 220, 406 to at least one business object 206, 208. In certain instances, one or more business objects 206, 208 may be communicatively coupled to the business object event source 204, 400 within the business object environment. For example, the business object event source 204, 400 may be implemented as a separate computing process and/or a separate computing device within the business object environment. In such instances, the business object event source 204, 400 may provide the business object event 218, 220, 406 to the business objects 206, 208 by transmitting the business object event 218, 220, 406 to the business object 206, 208. In still further implementations, the business object event source 204, 400 may be implemented within a business object 206, 208. In such instances, the business object event 218, 220, 406 may be provided to the business object by providing or otherwise enabling another component or process of the business object 206, 208 to access and/or utilize the business object events 218, 220, 406. Upon receiving the business object events 218, 220, 406, the business object 206, 208 may perform one or more actions 222, 224. For example, the actions 222, 224 may execute based on data included within one or more properties 416 of the business object event 218, 220, 406.

The method 500 may enable event sources to be added to business object environments. In particular, the method 500 may enable the creation of business object event sources that process or otherwise prepare events received from event sources (e.g., external or internal event sources) for use by business objects 206, 208. In particular, where the business object event sources include translation functions prepared based on schemas of existing data sources, the business object events may be created to utilize the same properties as the business objects. Accordingly, business object events created by the business object event sources allow for event-based functionality to be added to existing business objects and business object environments without requiring further setup or configuration of the business objects.

Figure 6:
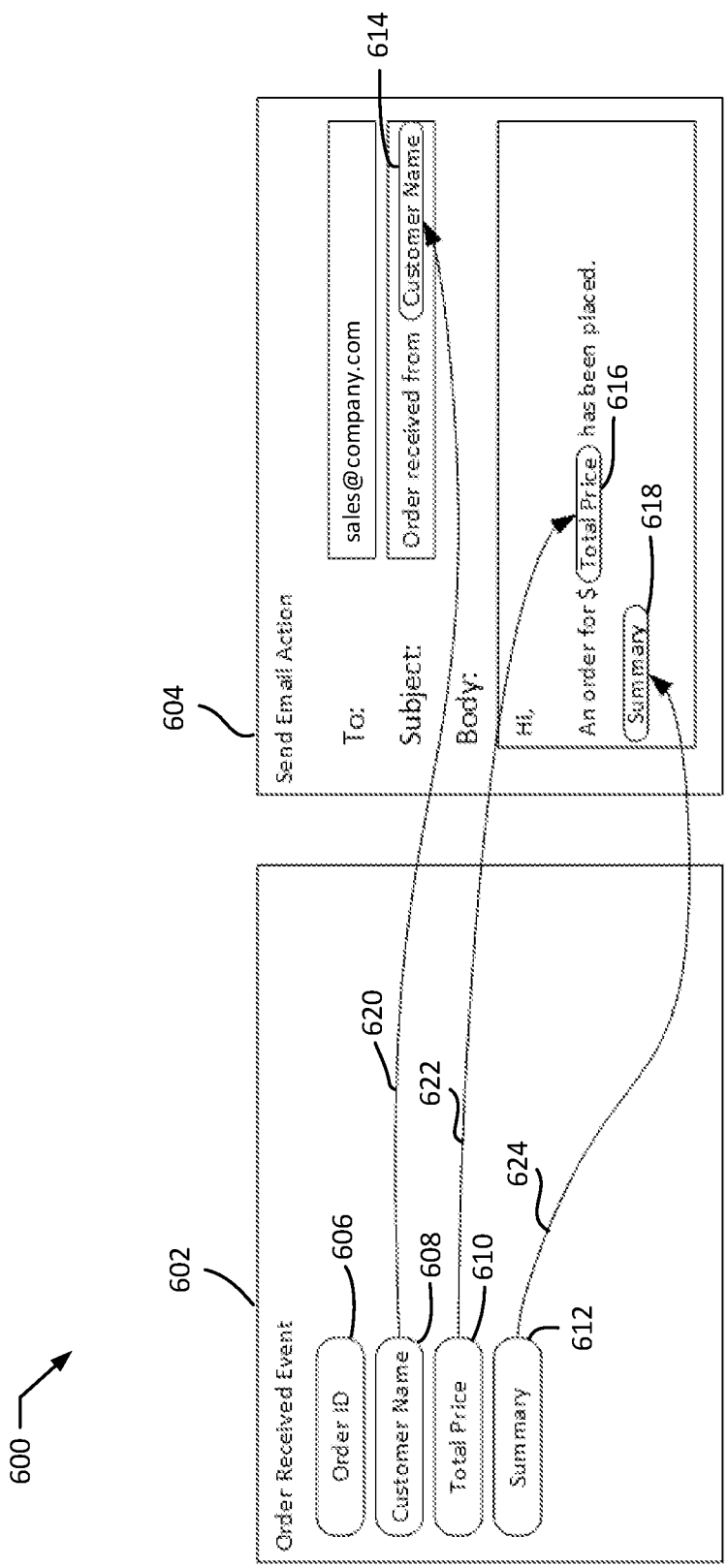
FIG. 6 illustrates a mapping for an action according to an exemplary embodiment of the present disclosure.

FIG. 6 illustrates a mapping 600 for an action according to an exemplary embodiment of the present disclosure. The mapping 600 includes an event 602 and an action 604. The event 602 is an order received event, which may be created and transmitted by an ordering system upon receiving a new order from a customer. The event 602 includes multiple properties 606, 608, 610, 612, including an order ID property 606, a customer name property 608, a total price property 610, and a summary property 612. The order ID property 606 may be similar to the Order ID property within the properties 416, the total price property 610 may be similar to the Total Price property within the properties 416, and the Summary property 612 may be similar to the Order Summary property within the properties 416. The Customer Name property 608 may be similar to the Customer ID property within the properties 416, but may specify a name for the customer instead of a numerical identifier.

The action 604 is a send email action, which may be performed in response to receiving an order received event 602. In particular, the action 604 may be linked to the order received event 602 according to a request (e.g., a request received from a user or other computing process) to perform the action 604 in response to receiving order received events 602. The action 604 specifies a template email for use in sending an email in response to receiving the event 602. The template email specifies a "to" address that identifies the email address to which an email is to be sent (i.e., "sales@company.com"). The template email also includes a subject line and a body section. As depicted, the subject line and the body section include fields 614, 616, 618 may be updated based on data or properties included within the order received event 602. In particular, the subject line includes a customer name field 614 in the body includes a total price field 616 and a summary field 618. As specified by the mapping 620, 622, 624, the customer name field 614 may correspond to the customer name property 608 within the event 602, the total price field 616 may correspond to the total price property 610 within the event 602, and the summary field 618 may correspond to the summary 612 within the event 602. In particular, the fields 614, 616, 618 may be updated with data included within the corresponding properties 608, 610, 612 of the event 602 prior to sending the email.

Actions such as the action 604 may be created using a visual programming interface. For example, the visual programming interface may include a visual depiction of one or more types of business object events received by a business object. In one such example, the visual depiction of a business object event may include a depiction of properties included within the business object event, similar to the depiction of the event 602 within FIG. 6. The visual programming interface may also allow creation of actions. In particular, different types of actions (e.g., send email actions, perform method actions, perform workflow actions) may have different types of visual interfaces. The visual interfaces may include one or more fields describing required or optional parameters. For example, the visual interface for creating and configuring a send email action may be similar to the depiction of the action 604 within FIG. 6. Fields may be added within a visual interface used to create an action. For example, fields similar to the fields 614, 616, 618 may be added to an action (e.g., by inserting fields using a field adding interface, by dragging and dropping fields from a visual interface for the business object event).

In this way, visual interfaces similar to those used to create and configure business objects may be used to create and configure actions executed by the business objects in response to receiving events. Furthermore, it should be understood that the mappings and visual interfaces depicted and discussed above in connection with FIG. 6 are merely exemplary. Additional or alternative mappings and interfaces may be apparent to those skilled in the art in light of the above descriptions. For example, certain implementations may include code-based or text-based interfaces for creating mappings. All such mappings and interfaces are hereby considered within the scope of this disclosure.

Figure 7:
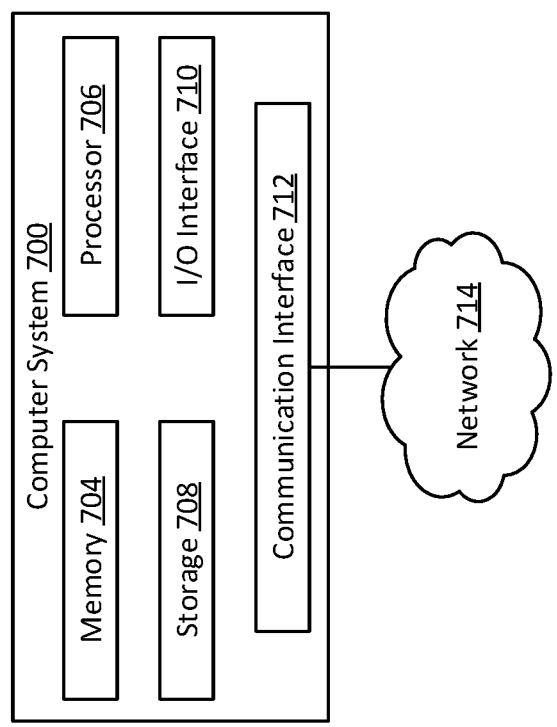
FIG. 7 illustrates a computer system according to an exemplary embodiment of the present disclosure.

FIG. 7 illustrates an example computer system 700 that may be utilized to implement one or more of the devices and/or components discussed herein, such as the business objects 112, 114, 206, 208, the user interfaces 116, 118, 120, 226, the data sources 102, the broker services 108, 110, the event source 202, the business object event sources 204, 400, and/or the discovery function 312. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates the computer system 700 taking any suitable physical form. As example and not by way of limitation, the computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 706, memory 704, storage 708, an input/output (I/O) interface 710, and a communication interface 712. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 706 includes hardware for executing instructions, such as those making up a computer program. As an example and not by way of limitation, to execute instructions, the processor 706 may retrieve (or fetch) the instructions from an internal register, an internal cache, memory 704, or storage 708; decode and execute the instructions; and then write one or more results to an internal register, internal cache, memory 704, or storage 708. In particular embodiments, the processor 706 may include one or more internal caches for data, instructions, or addresses. This disclosure contemplates the processor 706 including any suitable number of any suitable internal caches, where appropriate. As an example and not by way of limitation, the processor 706 may include one or more instruction caches, one or more data caches, and one or more translation lookaside buffers (TLBs). Instructions in the instruction caches may be copies of instructions in memory 704 or storage 708, and the instruction caches may speed up retrieval of those instructions by the processor 706. Data in the data caches may be copies of data in memory 704 or storage 708 that are to be operated on by computer instructions; the results of previous instructions executed by the processor 706 that are accessible to subsequent instructions or for writing to memory 704 or storage 708; or any other suitable data. The data caches may speed up read or write operations by the processor 706. The TLBs may speed up virtual-address translation for the processor 706. In particular embodiments, processor 706 may include one or more internal registers for data, instructions, or addresses. This disclosure contemplates the processor 706 including any suitable number of any suitable internal registers, where appropriate. Where appropriate, the processor 706 may include one or more arithmetic logic units (ALUs), be a multi-core processor, or include one or more processors 706. Although this disclosure describes and illustrates a particular processor, this disclosure contemplates any suitable processor.

In particular embodiments, the memory 704 includes main memory for storing instructions for the processor 706 to execute or data for processor 706 to operate on. As an example, and not by way of limitation, computer system 700 may load instructions from storage 708 or another source (such as another computer system 700) to the memory 704. The processor 706 may then load the instructions from the memory 704 to an internal register or internal cache. To execute the instructions, the processor 706 may retrieve the instructions from the internal register or internal cache and decode them. During or after execution of the instructions, the processor 706 may write one or more results (which may be intermediate or final results) to the internal register or internal cache. The processor 706 may then write one or more of those results to the memory 704. In particular embodiments, the processor 706 executes only instructions in one or more internal registers or internal caches or in memory 704 (as opposed to storage 708 or elsewhere) and operates only on data in one or more internal registers or internal caches or in memory 704 (as opposed to storage 708 or elsewhere). One or more memory buses (which may each include an address bus and a data bus) may couple the processor 706 to the memory 704. The bus may include one or more memory buses, as described in further detail below. In particular embodiments, one or more memory management units (MMUs) reside between the processor 706 and memory 704 and facilitate accesses to the memory 704 requested by the processor 706. In particular embodiments, the memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory implementations, this disclosure contemplates any suitable memory implementation.

In particular embodiments, the storage 708 includes mass storage for data or instructions. As an example and not by way of limitation, the storage 708 may include a hard disk drive (HDD), a floppy disk drive, flash memory, an optical disc, a magneto-optical disc, magnetic tape, or a Universal Serial Bus (USB) drive or a combination of two or more of these. The storage 708 may include removable or non-removable (or fixed) media, where appropriate. The storage 708 may be internal or external to computer system 700, where appropriate. In particular embodiments, the storage 708 is non-volatile, solid-state memory. In particular embodiments, the storage 708 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 708 taking any suitable physical form. The storage 708 may include one or more storage control units facilitating communication between processor 706 and storage 708, where appropriate. Where appropriate, the storage 708 may include one or more storages 708. Although this disclosure describes and illustrates particular storage, this disclosure contemplates any suitable storage.

In particular embodiments, the I/O Interface 710 includes hardware, software, or both, providing one or more interfaces for communication between computer system 700 and one or more I/O devices. The computer system 700 may include one or more of these I/O devices, where appropriate. One or more of these I/O devices may enable communication between a person (i.e., a user) and computer system 700. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 710 may include one or more device or software drivers enabling processor 706 to drive one or more of these I/O devices. The I/O interface 710 may include one or more I/O interfaces 710, where appropriate. Although this disclosure describes and illustrates a particular I/O interface, this disclosure contemplates any suitable I/O interface or combination of I/O interfaces.

In particular embodiments, communication interface 712 includes hardware, software, or both providing one or more interfaces for communication (such as, for example, packet-based communication) between computer system 700 and one or more other computer systems 700 or one or more networks 714. As an example and not by way of limitation, communication interface 712 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 714 and any suitable communication interface 712 for the network 714. As an example and not by way of limitation, the network 714 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 712 for any of these networks, where appropriate. Communication interface 712 may include one or more communication interfaces 712, where appropriate. Although this disclosure describes and illustrates a particular communication interface implementations, this disclosure contemplates any suitable communication interface implementation.

The computer system 702 may also include a bus. The bus may include hardware, software, or both and may communicatively couple the components of the computer system 700 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving, via a discovery function, a schema corresponding to a data source within a business object environment, the schema describing properties of the data source;
creating, within the business object environment, a business object event source including an inbox that receives events from an event source and a translation function that translates events from the event source;
receiving, at the inbox, an event from the event source;
translating, according to the translation function, the event from the event source into a business object event that corresponds to at least one of the properties of the data source;
providing the business object event to at least one business object within the business object environment;
receiving a request to link the business object event to an action performed by the at least one business object;
linking, within the at least one business object, the business object event to an action such that the action is performed whenever the business object event is received from the business object event source; and
executing, by the at least one business object, the action in response to receiving the business object event.

2. The method of claim 1, wherein the translation function includes a mapping from contents of events to corresponding properties of the data source.

3. The method of claim 1, wherein the translation function is determined based on at least one of (i) indications of corresponding properties included within events received from the event source and (ii) names of data fields included within events received from the event source.

4. The method of claim 1, further comprising translating the event from the event source into two or more business object events.

5. The method of claim 1, wherein the action includes one or more of performing a method of the at least one business object, executing a workflow based on the at least one business object, and updating a property of the at least one business object.

6. The method of claim 1, wherein the business object event source contains a plurality of inboxes.

7. The method of claim 6, further comprising translating at least two events from at least two of the plurality of inboxes into a business object event.

8. The method of claim 6, wherein at least two of the plurality of inboxes correspond to the event source.

9. The method of claim 6, wherein the plurality of inboxes correspond to a plurality of event sources.

10. A system comprising:
a processor; and
a memory storing instructions which, when executed by the processor, cause the processor to:
receive, via a discovery function, a schema corresponding to a data source within a business object environment, the schema describing properties of the data source;
create, within the business object environment, a business object event source including an inbox that receives events from an event source and a translation function that translates events from the event source;
receive, at the inbox, an event from the event source;
translate, according to the translation function, the event from the event source into a business object event that corresponds to at least one of the properties of the data source;
provide the business object event to at least one business object within the business object environment;
receive a request to link the business object event to an action performed by at least one business object;
link, within the at least one business object, the business object event to an action such that the action is performed whenever the business object event is received from the business object event source; and
execute, by the at least one business object, the action in response to receiving the business object event.

11. The system of claim 10, wherein the translation function includes a mapping from contents of events to corresponding properties of the data source.

12. The system of claim 10, wherein the translation function is determined based on at least one of (i) indications of corresponding properties included within events received from the event source and (ii) names of data fields included within events received from the event source.

13. The system of claim 10, wherein the instructions further cause the processor to translate the event from the event source into two or more business object events.

14. The system of claim 10, wherein the instructions further cause the processor to execute, by the at least one business object, an action in response to receiving the business object event.

15. The system of claim 10, wherein the business object event source contains a plurality of inboxes.

16. The system of claim 15, wherein the instructions further cause the processor to translate at least two events from at least two of the plurality of inboxes into a business object event.

17. The system of claim 15, wherein at least two of the plurality of inboxes correspond to the event source.

18. A non-transitory, computer-readable medium storing instructions which, when executed by the processor, cause the processor to:
receive, via a discovery function, a schema corresponding to a data source within a business object environment, the schema describing properties of the data source;
create, within the business object environment, a business object event source including an inbox that receives events from an event source and a translation function that translates events from the event source;
receive, at the inbox, an event from the event source;
translate, according to the translation function, the event from the event source into a business object event that corresponds to at least one of the properties of the data source; and
provide the business object event to at least one business object;
receive a request to link the business object event to an action performed by the at least one business object;
link, within the at least one business object, the business object event to an action such that the action is performed whenever the business object event is received from the business object event source; and
execute, by the at least one business object, the action in response to receiving the business object event.

* * * * *